United States Patent Office 3,291,801
Patented Dec. 13, 1966

3,291,801
NOVEL OCTAHYDRO-6(5)-PHENANTHRIDINONES
AND PREPARATION THEREOF
Stewart R. Montgomery, Silver Spring, Md., assignor to W. R. Grace & Co., New York, N.Y., a corporation of Connecticut
No Drawing. Filed May 23, 1963, Ser. No. 282,552
6 Claims. (Cl. 260—289)

The present invention relates to novel compositions of matter, and more specifically to a novel octahydrogenated 6(5)-phenanthridinone and its derivatives, their production, and to a method for obtaining the corresponding 6(5)-phenanthridinones therefrom.

It is known that phenanthridium salts which are substituted on the (6)-position with either alkyl or aryl groups have been widely used as therapeutic agents. For example 6-(4'-dimethylaminophenyl)-5-methylphenanthridinium chloride inhibits B. coli at a concentration of 1:200,000.

These therapeutically active phenanthridinium salts are prepared by conventional synthetic methods from relatively difficult to prepare 6(5)-phenanthridinones. An inexpensive and convenient route to produce this valuable intermediate would represent a substantial advancement in the art.

It is therefore an object of the present invention to provide novel octahydro-6(5)-phenanthridinone derivatives.

It is a further object to provide a method by which the corresponding-6(5)-phenanthridinones may be readily obtained from octahydro-6(5)-phenanthridinones.

It is another object to provide a convenient method for producing octahydro-6(5)-phenanthridinones.

These and still further objects of the present invention will become readily apparent to one skilled in the art from the following detailed description and specific examples.

Broadly, the present invention contemplates novel octahydro-6(5)-phenanthridinone compounds of the formula

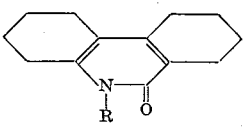

wherein R represents a hydrogen or hydrocarbon radical. These octahydro-6(5)-phenanthridinones may be converted to the corresponding 6(5)-phenanthridinones by dehydrogenation with sulfur or other dehydrogenating agents such as selenium, palladium on charcoal, etc. at 230 to 250 °C. This reaction is illustrated below.

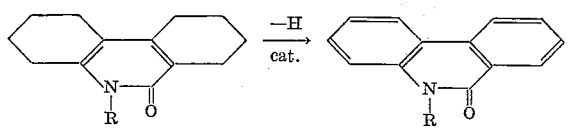

More specifically, I have found that when an alkyl N-(1-cyclohexen-1-yl)-carbamate such as methyl, ethyl, propyl, or butyl N-(1-cyclohexen-1-yl)-carbamate (or a non-aqueous solution thereof) is heated to a temperature of from about 170 to about 220° C. that a reaction occurs wherein 1,2,3,4,7,8,9,10-octahydro-6(5)-phenanthridinone is formed. The reaction may be illustrated as follows

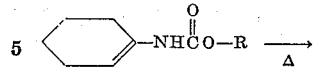

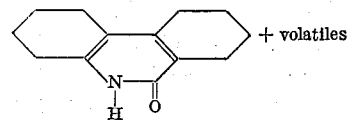

wherein R represents an alkyl radical having 1 to 8 carbon atoms.

The N-sodium salt of 1,2,3,4,7,8,9,10-octahydro-6(5)-phenanthridinone may be reacted with a hydrocarbon halide to form the corresponding hydrocarbon derivatives according to the following reaction.

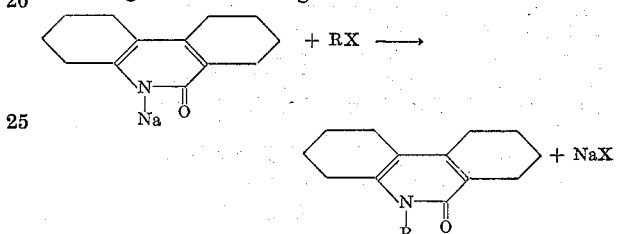

In the above reaction R represents a hydrocarbon radical such as alkyl having 1 to 18 carbon atoms, and phenyl alkylene wherein the alkylene substituent has 1 to 18 carbon atoms. Furthermore, the N-phenyl derivative of this type of compound may be obtained using phenyl lithium by methods known to any one skilled in the art.

The heating of the alkyl N-(1-cyclohexen-1-yl)-carbamates at 170 to 220° C. may be done at atmospheric pressure or under reduced pressure. Furthermore, the rate of reaction may be enhanced somewhat by the presence of from about 0.1 to about 10% by weight of a catalyst such as aniline hydrochloride. Under these conditions substantial yields of 1,2,3,4,7,8,9,10-octahydro-6(5)-phenanthridinones are obtained from about 0.5 to about 1 hour. If desired, the reaction may be conducted in the presence of a high-boiling solvent such as alkyl benzenes, dialkylethers of glycol, or diethylene glycol.

Subsequent to reaction, the 1,2,3,4,7,8,9,10-octahydro-6(5)-phenanthridinone reaction product is reduced to an impure solid by application of vacuum to the hot reaction product (this may be done during the course of the reaction if desired). The impure solid product may then be taken up in a solvent such as ethanol and recrystallized to obtain substantially pure 1,2,3,4,7,8,9,10-octahydro-6(5)-phenanthridinone having a melting point of 295–298° C.

The hydrocarbon substituted derivatives are prepared by first forming the alkali metal salt by reacting 1,2,3,4,7,8,9,10-octahydro-6(5)-phenanthridinone with metallic alkoxides in the presence of a solvent such as absolute ethanol, benzene, or any suitable low-boiling alcohol. Subsequently the alkali metal salt is reacted with a hydrocarbon halide at a temperature of from about 0° to about 140° C. Conveniently, both the salt formation and reaction with the halide may be carried out in the same reaction solvent. Subsequent to reaction the excess halide and reaction solvent is removed by evaporation. Upon cooling unconverted 1,2,3,4,7,8,9,10-octahydro-6(5)-phenanthridinone and any alkali metal halide may be removed by filtration. The product may then be recovered by subsequent crystallization.

When it is desired to convert the present 1,2,3,4,7,8,9,10-octahydro-6(5)-phenanthridinones to the corresponding 6(5)-phenanthridinones, this may be achieved by heating the 1,2,3,4,7,8,9,10-octahydro-6(5)-phenanthridinone with approximately 4 molar amounts of sulfur at a temperature of from about 230 to 280° C. This reaction will give appreciable conversions in from about 0.5 to about 2 hours after the reaction temperature is attained. Any excess sulfur may be removed from the reaction mixture by extraction with carbon disulfide. Subsequent to carbon disulfide extraction, 6(5)-phenanthridinone may be further purified by vacuum sublimation at temperatures of 260 to 280° C. and above.

Having described the basic elements of the present invention the following detailed examples are given to illustrate the embodiments thereof.

*Example I*

8.5 g. of ethyl N-(1-cyclohexen-1-yl)-carbamate was heated to 210° C. under a pressure of 200 mm. of mercury (absolute). After a few minutes the material began to boil vigorously and the volatile products were distilled away from the reaction zone. After 30 minutes of heating the reaction vessel was cooled to room temperature. An orange solid residue remained in the reaction vessel (2.9 g.) from which colorless crystals of pure 1,2,3,4,7,8,9,10-octahydro - 6(5) - phenanthridinone with a melting point of 295–298° C. were recovered by recrystallization from ethanol. Elemental analysis yielded the following result.

Calculated for $C_{13}H_{17}NO$: C, 76.80; H, 8.43; N, 6.89. Found: C, 76.75; H, 8.27; N, 6.90.

*Example II*

To dehalogenate the material obtained in Example I an intimate physical mixture of 3 g. of sulfur and 1.44 g. of 1,2,3,4,7,8,9,10-octahydro-6(5)-phenanthridinone obtained above was heated to 250° C. for 30 minutes. The dark-brown solid was formed which was extracted with carbon disulfide to remove the excess sulfur. The residue that remained was purified by vacuum sublimation at 260–280° C. The sublimate was recrystallized from ethanol to give a colorless, crystalline solid having a melting point of 290–293° C. The infrared spectrum and the melting point of this compound were those of 6(5)-phenanthridinone.

*Example III*

The sodium salt of 1,2,3,4,7,8,9,10-octahydro-6(5)-phenanthridinone was prepared by dissolving 4 g. of sodium and 5 g. of the octahydro-6(5)-phenanthridinone in 200 ml. of absolute ethyl alcohol. Benzyl chloride (30 ml.) was added and the solution was refluxed for an hour at 75° C. The unreacted benzyl chloride and excess ethyl alcohol were removed from the reaction mixture by distillation under vacuum. The remaining liquid residue was cooled and filtered to remove the unconverted octahydro-6(5)-phenanthridinone as well as the sodium chloride that had formed. Upon diluting the filtrate with a small amount of 50% acetone, 5-benzyl 1,2,3,4,7,8,9,10-octahydro-6(5)-phenanthridinone having a melting point of 77–78° C. crystallized from the solution as white crystals.

Elemental analysis for nitrogen yielded the following results.

Calculated for $C_{20}H_{23}NO$: N, 4.78. Found: N, 4.80.

The nuclear magnetic resonance spectrum of this compound was consistent with the assigned structure.

*Example IV*

A method similar to that set forth in Example III, methyl iodide was reacted with the sodium salt of 1,2,3,4,7,8,9,10-octahydro-6(5)-phenanthridinone to give 5 - methyl - 1,2,3,4,7,8,9,10 - octahydro - 6(5) - phenanthridinone having a melting point of 141–142° C. Elemental analysis yielded the following result.

Calculated for $C_{14}H_{19}NO$: C, 77.37; H, 8.82; N, 6.44. Found: C, 77.11; H, 8.80; N, 6.37.

When this compound was heated near its melting point it produced an intense odor resembling that of sandalwood and therefore finds utility as an incense ingredient when admixed with a combustionable carrier such as paraffin, wax, sawdust, etc.

From the above it is seen that the present invention offers a method by which novel octahydro-6(5)-phenanthridinones may be obtained. These octahydro derivatives may be readily converted to the corresponding 6(5)-phenanthridinones which in turn find utility as intermediates for forming therapeutically active compounds.

I claim:

1. Compounds of the formula

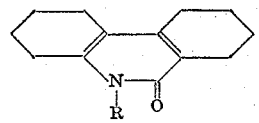

wherein R is selected from the group consisting of hydrogen, lower alkyl and benzyl groups.

2. The compound 1,2,3,4,7,8,9,10-octahydro-6(5)-phenanthridinone.

3. The compound 5-benzyl-1,2,3,4,7,8,9,10-octahydro-6(5)-phenanthridinone.

4. The compound 5-methyl-1,2,3,4,7,8,9,10-octahydro-6(5)-phenanthridinone.

5. A method for preparing 1,2,3,4,7,8,9,10-octahydro-6(5)-phenanthridinone which comprises heating an alkyl N-(cyclohexen-1-yl)-carbamate to a temperature of from about 170° to about 220° C., removing volatile reaction products formed during said heating, and recovering 1,2,3,4,7,8,9,10-octahydro - 6(5) - phenanthridinone from the residue.

6. The method of claim 5 wherein said heating is conducted in the presence of from about 0.1 to about 10% by weight aniline hydrochloride based on the weight of said alkyl N-(1-cyclohexen-1-yl)-carbamate.

References Cited by the Examiner

UNITED STATES PATENTS

| | | | |
|---|---|---|---|
| 2,003,684 | 6/1935 | Frantz | 167—94 |
| 2,478,805 | 8/1949 | Butler | 260—289 |
| 2,538,342 | 1/1951 | Ullyot | 260—289 |
| 3,022,222 | 2/1962 | Hennis et al. | 167—94 |

OTHER REFERENCES

Encyclopedia of Polymer Science, vol. 1 (Wiley), 1964, page 643.

ALEX MAZEL, *Primary Examiner.*

D. G. DAUS, *Assistant Examiner.*